United States Patent [19]

Gilbert et al.

[11] 4,266,927
[45] May 12, 1981

[54] APPARATUS FOR MOLDING A PLASTIC ARTICLE

[75] Inventors: Robert W. Gilbert, Libertyville; Gunther W. Torau, Buffalo Grove, both of Ill.

[73] Assignee: Baxter Travenol Laboratories, Inc., Deerfield, Ill.

[21] Appl. No.: 58,934

[22] Filed: Jul. 19, 1979

Related U.S. Application Data

[63] Continuation-in-part of Ser. No. 13,783, Feb. 21, 1979, abandoned.

[51] Int. Cl.³ ............................................. B29C 17/07
[52] U.S. Cl. .................................. 425/526; 264/521; 264/525; 264/534; 425/524; 425/527
[58] Field of Search ............... 425/524, 525, 526, 527, 425/531; 264/521, 524, 525, 531, 533, 534, 520

[56] References Cited

U.S. PATENT DOCUMENTS

| | | | |
|---|---|---|---|
| 3,390,425 | 7/1968 | Sheptak | 425/525 |
| 3,423,495 | 1/1969 | Bachner | 425/524 X |
| 3,464,085 | 9/1969 | Burkett et al. | 264/525 X |
| 3,499,071 | 3/1970 | Hurst | 425/525 X |
| 3,592,885 | 7/1971 | Goins et al. | 425/527 X |
| 3,619,857 | 11/1971 | Gilbert | 425/531 |
| 3,817,676 | 6/1974 | Seefluth | 425/531 |
| 3,942,932 | 3/1976 | Gilbert | 425/531 X |

FOREIGN PATENT DOCUMENTS 1103318  2/1968  United Kingdom ..................... 425/525

*Primary Examiner*—Jan H. Silbaugh
*Attorney, Agent, or Firm*—Paul C. Flattery; Gary W. McFarron; John A. Caruso

[57] ABSTRACT

Apparatus and method are disclosed for closing and sealing a molded plastic article formed by expanding a heated plastic parison within a chamber or cavity defined by a plurality of mold sections. The article is closed and sealed by at least one movable sealing member which has a protruding pinch surface to weaken or sever the parison and recess surface portions selectively above or below the protruding pinch surface which provide plastic-receiving reservoirs that aid in the formation of an unobtrusive seal adjacent the surface of the article. The sealing member may also include parison engaging seat or heel portions which further aid in the sealing operation. The temperature of the mold sections adjacent the sealing operation is controlled to selectively retard the cooling of the parison, which is in direct contact with the cavity surface, to maintain the parison at a sufficiently elevated temperature to permit closing and sealing by the sealing member.

16 Claims, 18 Drawing Figures

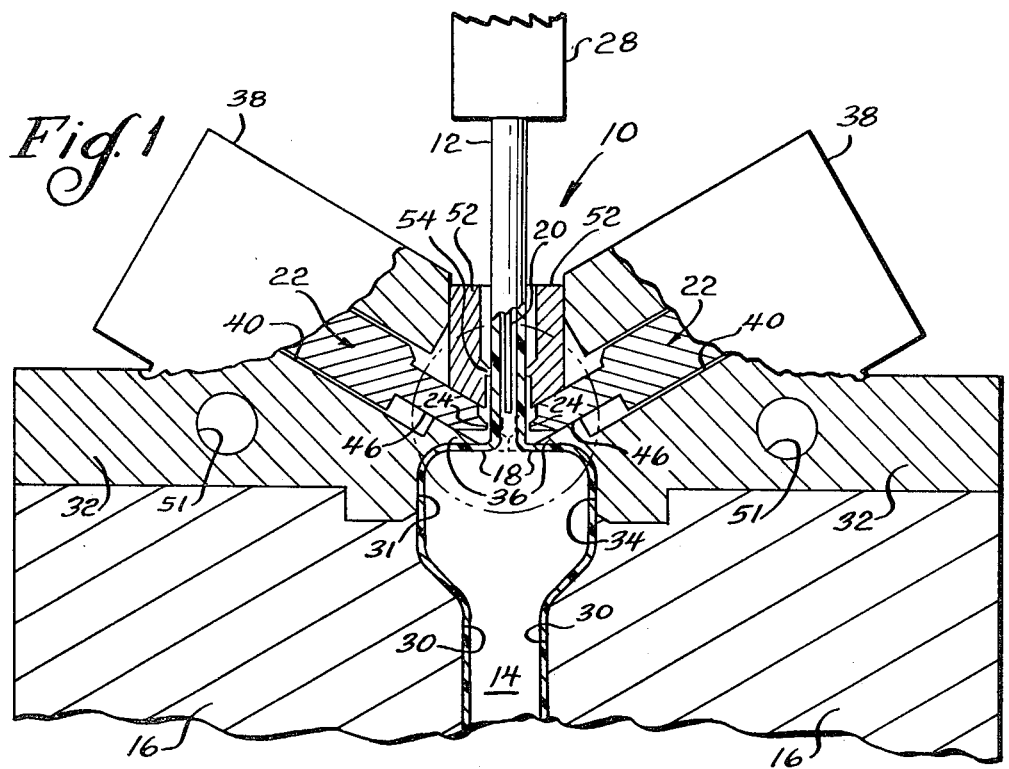
Fig. 1
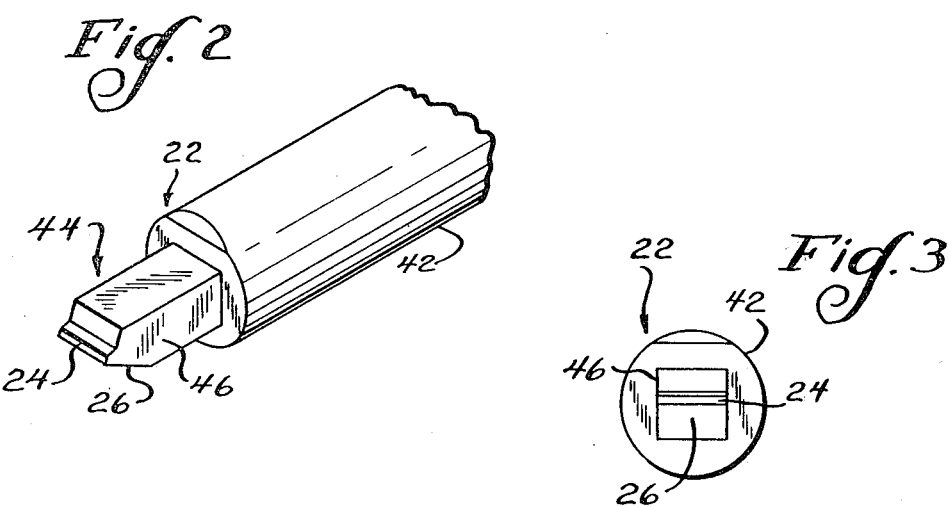
Fig. 2
Fig. 3

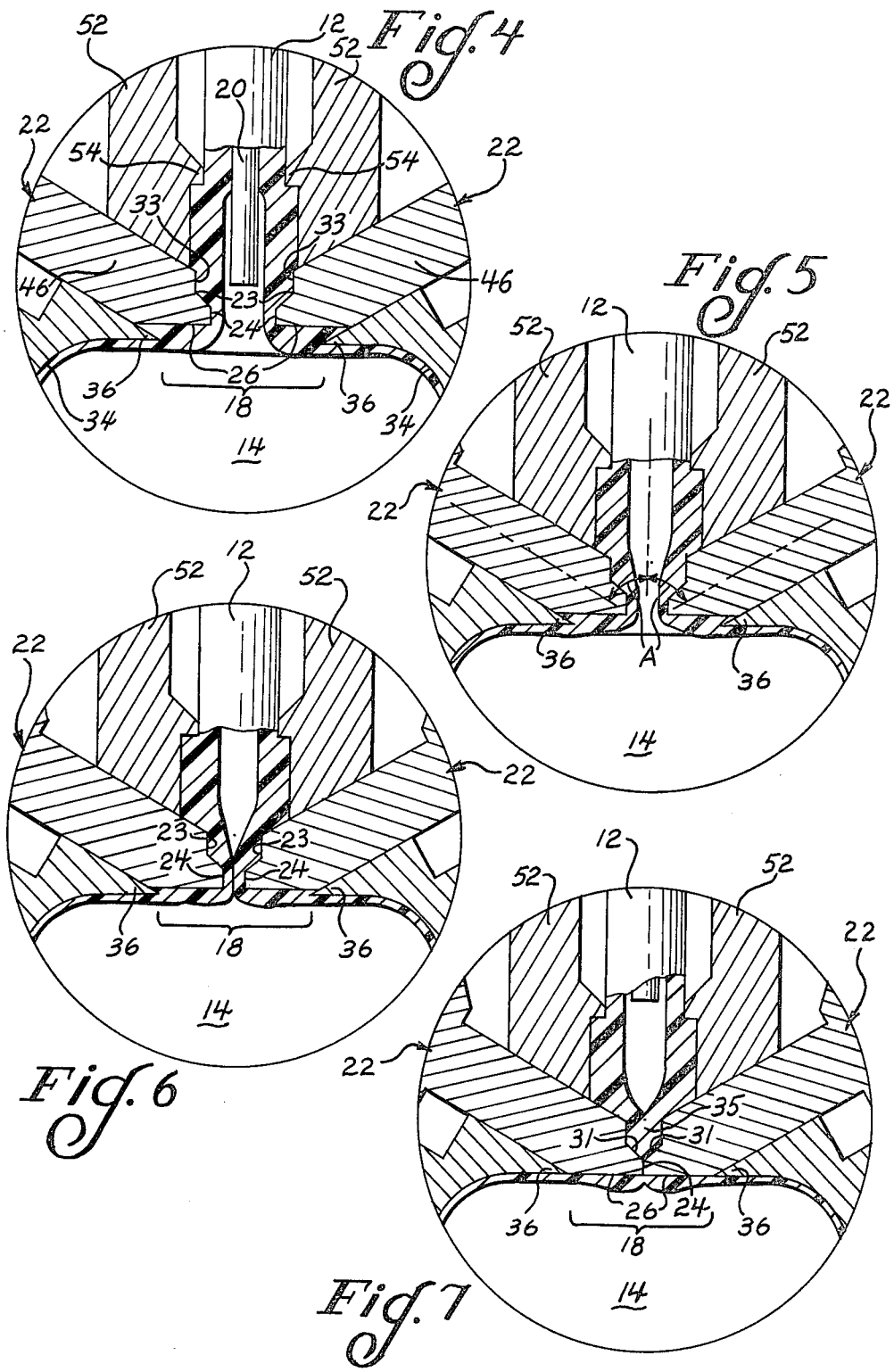

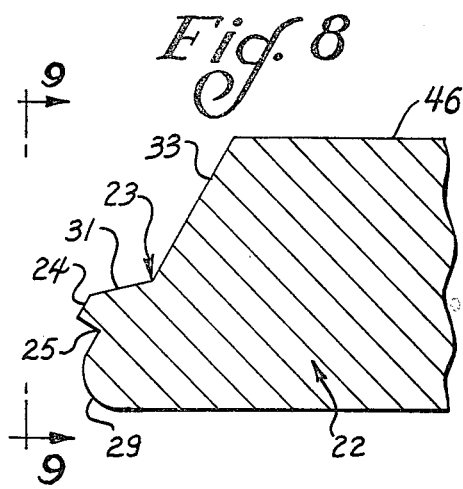
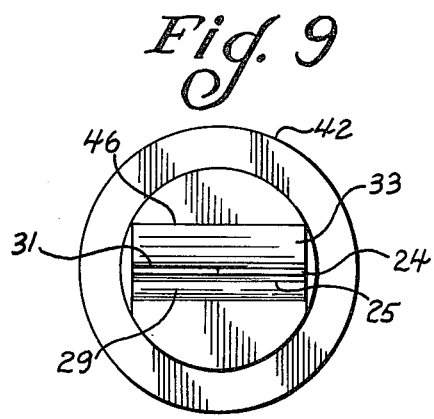
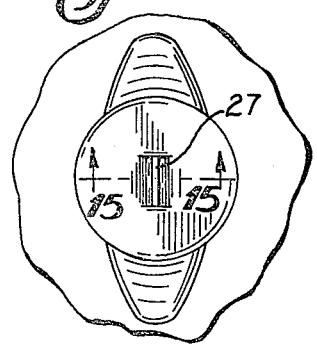
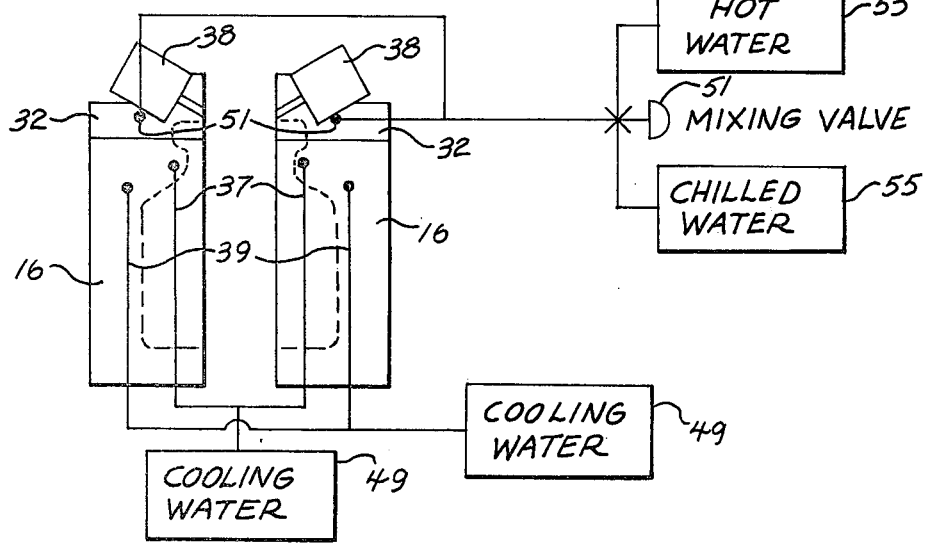

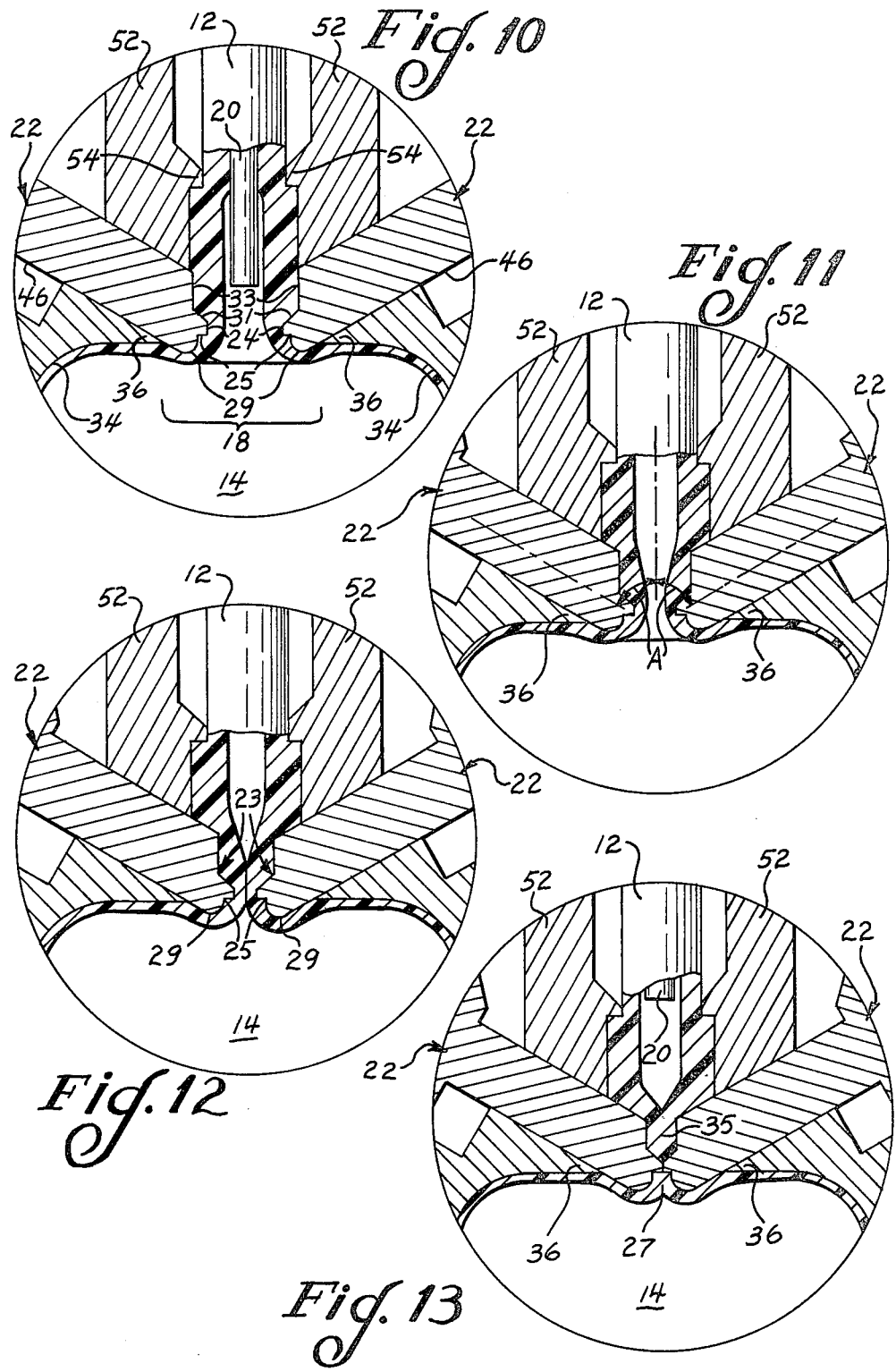

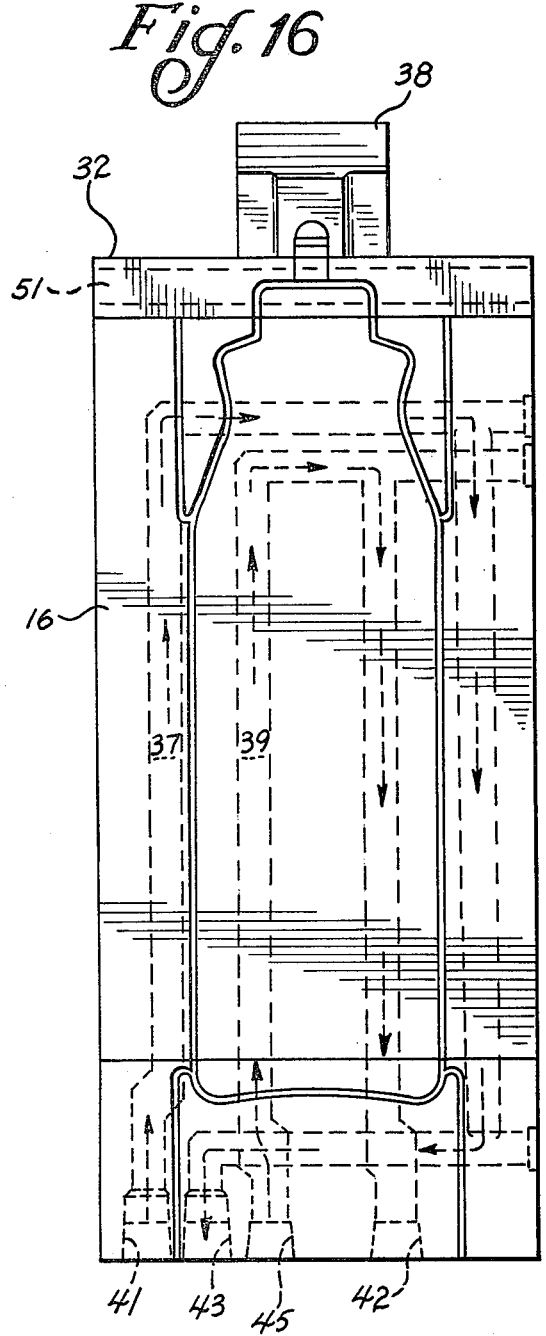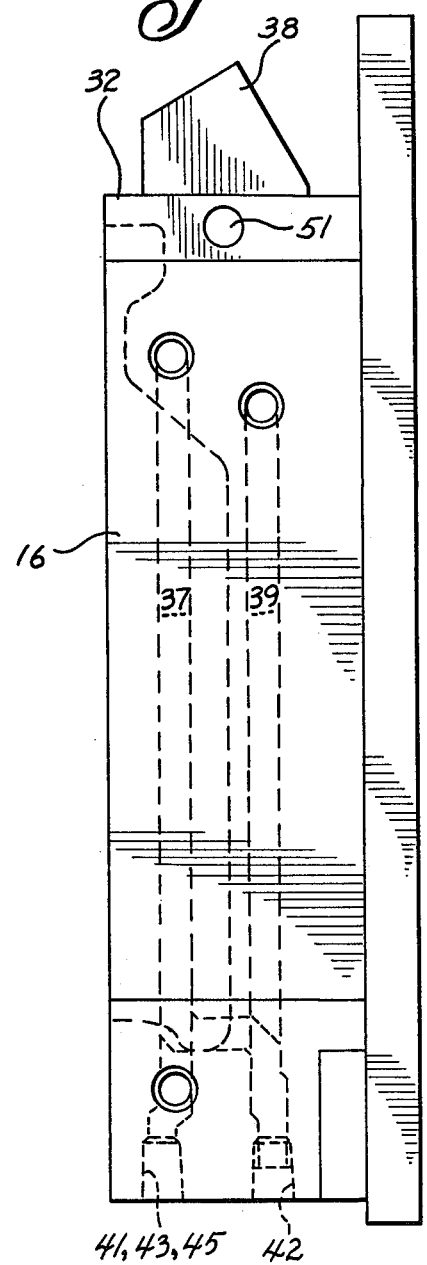

APPARATUS FOR MOLDING A PLASTIC ARTICLE

This is a continuation-in-part of pending U.S. patent application Ser. No. 013,783, filed Feb. 21, 1979, now abandoned.

The present invention is generally related to the manufacture of plastic articles by the method of expanding a plastic parison within an internal chamber or cavity defined by a plurality of molds or mold sections. More particularly, the present invention concerns a method and apparatus for closing and sealing articles so formed.

Plastic molding in which a heated plastic tube or parison is expanded within a chamber or cavity of desired shape, often called "blow molding", is a well-known technique for making plastic articles, such as containers, bottles or the like. Typically, the chamber or cavity is defined between at least a pair of mold halves which are movable between an open position, where they are spaced apart to release a molded article or to receive a new heated parison between them and a closed position where they are joined to define the cavity around the parison. The parison usually extends through a single opening between the mold halves, and may be expanded to conform to the cavity surface by forcing compressed air into the parison, drawing a vacuum between the parison and the mold or some combination of these. After the article has been formed within the mold, it is severed from the remainder of the parison, and the mold is opened to release the finished product.

Most often, plastic articles, e.g., containers or bottles, made in a blow molding operation have an open end or neck that is formed at the opening in the mold cavity through which the parison extends. This invention, however, is directed to novel apparatus and method for integrally closing and sealing molded articles while they are in the mold. This is needed in the manufacture of closed and sealed sterile containers, such as those used for the collection or storage of blood plasma. One example of such a plasma container is described in U.S. Pat. No. 3,939,623. The blood plasma bottle there is empty, except for sterile air, when molded, and later filled with plasma taken from donors at various blood collection centers for transportation to blood processing facilities. To transfer plasma from the flexible plastic pouch in whch it is usually collected to be sealed, empty bottle, a spike with attached transfer tubing is inserted into the top of the bottle. Thus, the top of the bottle should, for convenience, have a generous area through which a puncture may be made, should be sufficiently thin to permit relatively easy puncturing by the spike while strong enough to resist accidental puncture or fracture and should not have any obstructions or the like which interfere with use of the spike.

The techniques for molding open top containers provide little assistance in sealing a blown article such as the plasma bottle discussed above. To the extent that molded containers or articles previously have been sealed and closed during the molding operation, such have employed relatively complicated apparatus, have resulted in seals which would interfere with the use of a spike or are otherwise inappropriate for the plasma collection application, or have used techniques which result in undue stretching or weakening of the plastic. For example, the plasma bottle shown in U.S. Pat. No. 3,939,623 has been made on relatively complex molding apparatus of the type generally described in U.S. Pat. No. Re. 27,155. The molding machine shown in that patent uses upper and lower sets of molds which are movable relatively to each other, and are movable as a unit between an extruding station and a blow-filling station. For molding an empty bottle, the filling apparatus is not used. After the body of the container has been blown by compressed air, the closed end of the container is formed by vacuum applied through the upper set of molds. Although workable, this equipment is relatively complex and expensive for forming a sealed empty container or the like, and precautions must be taken to preserve sterility during movement of the molds between the different stations.

Other apparatus for sealing blown containers or other plastic articles are shown in U.S. Pat. Nos. 4,026,982; 3,897,670; 3,861,846; 3,814,783; 3,464,085; 3,452,125; 3,396,345; 3,325,860; 2,991,500; 2,756,461; 2,541,249 and 2,349,177. However, these also have shortcomings. For example, in U.S. Pat. Nos. 3,814,783 and 3,861,846, which use vacuum for forming the container, a pair of blunt opposed sealing heads are slidably mounted in the molds for movement at right angles to the parison to form an upstanding seal tab on the top of the container. The right-angle positioning of the sealing heads requires that the molds be wider, thereby taking up additional valuable space for the molding operation within the machine, Also, direct engagement of the parison at right angles by the blunt sealing heads is believed to result in undue stretching and weakening of the plastic as the parison is pinched between the opposing sealing heads. The container in the U.S. Pat. No. 3,814,783 also has an upstanding seal tab at the top end, which would make it difficult to insert a spike into the top for the transfer of liquid.

One or more of the above-described shortcomings also may be found in the other cited patents. For example, U.S. Pat. No. 3,464,085 shows molding apparatus for forming, filling and sealing a one-piece container. In one embodiment there, outwardly directed nobs or folds of plastic are formed at the top of the container when it is blown. A slidable sealing bar reverses the folded direction of the nobs to move the plastic across the container to form a very complex, multi-sided closure, not suitable to receive a spike or the like for the transferring liquid into the bottle. A similar deficiency arises in the alternative embodiment of that patent, which has upstanding tab closure much like that shown in the earlier described patents formed by compressing the parison between blunt sealing bars. Also, the mold in the U.S. Pat. No. 3,464,085 is heated in the area of the closure to keep the plastic sufficiently molten for the sealing operation. It is believed that the temperature for such a complicated seal would be near the melt temperature for the plastic used, thus requiring the existence of facilities to provide a very hot liquid or gas to maintain the temperature at the sealing area.

Accordingly, it is an object of the present invention to provide improved apparatus and method for closing and sealing a plastic article, such as a container, which does not suffer the deficiencies explained above.

In addition, it is an object of the present invention to provide apparatus and method for closing and sealing a plastic container which does not result in unnecessary stretching or weakening of plastic adjacent the closure.

A further object of the present invention is to provide apparatus and method for closing and sealing a container wherein the closure is suitable for piercing by a spike for the transfer of liquid thereinto.

A still further object of the present invention is to provide means for selectively retarding the cooling of the parison to permit the article to be sealed adjacent the opening.

These and additional objects of the present invention are set forth in the following detailed description and the attached drawings, of which, FIG. 1 is a partial vertical sectional view of molds and molding apparatus employing the present invention;

FIG. 2 is a perspective view of a pinch rod employing the present invention;

FIG. 3 is an end view of the pinch rod of FIG. 2;

FIGS. 4–7 are enlarged sequential views exemplary of the sealing and closing of a container employing apparatus and method of the present invention, including the pinch rod of FIG. 2;

FIG. 8 is a sectional view of the end of another pinch rod employing the present invention;

FIG. 9 is an end view of the pinch rod of FIG. 8;

FIGS. 10–13 are enlarged sequential views exemplary of the sealing and closing of a container employing apparatus and method of the present invention, including the pinch rod of FIG. 8;

FIG. 14 is a top view of a container closed and sealed as shown in FIGS. 10–13;

FIG. 15 is a cross-sectional view taken along line 15—15 of FIG. 14, illustrating the seal formed in accordance with the present invention;

FIG. 16 is a front elevational view a mold halve used in molding the container of FIG. 14 with the temperature control conduits shown in phantom;

FIG. 17 is a side elevational view of the mold halve of FIG. 16; and

FIG. 18 is a schematic diagram of the mold temperature control system used in molding plastic articles in accordance with the present invention.

The present invention is generally embodied in molding apparatus 10 in which an extruded plastic parison 12 is positioned within a chamber or cavity 14 defined between a pair of mold halves 16. The parison extends through an aperture 18 in the cavity, and is expanded by compressed air through a blow pin 20 to conform to the shape of the cavity which may be that of a container or other plastic article. In accordance with the present invention, as best seen in FIGS. 2–7 and 8–13, the expanded parison is closed and sealed at the aperture 18 by collecting and folding a portion of the parison into the aperture and sealing it there. This is achieved by employing engagement means in the form of a sealing member or pinch rod 22 which engages the parison at a position spaced from the aperture 18 and is movable transversly of the parison, toward the aperture to collect and seal plastic there across without undue stretching or weakening of the plastic. The pinch rod 22 has an especially unique parison engaging surface that includes a protruding pinch edge 24 to sever or weaken the plastic parison adjacent the aperture 18, a dam-forming recess 23 above the pinch edge to prevent the escape of plastic needed in formation of the seal, and, as shown in FIGS. 8–13, may further include a reservoir-defining recess 25 below the pinch edge to collect plastic to form a reinforced thickened seal 27 if desired. A curved heel portion 29 (FIGS. 8–13) may also be provided below the pinch edge for smoothing the plastic parison across the aperture, although a seat surface 26 (FIGS. 4–7) corresponding to the desired exterior shape of the container has also been used. Preferably there is a pinch rod above each mold halve movable at an acute angle with respect to the parison to seal it between them at the mold parting line. An additional aspect of the present invention which contributes to the formation of a good seal for the plastic article is selective temperature control of the mold halves. As shown in FIG. 18, the mold halves 16 have at least two temperature control conduits or circuits that permit a selective variation in the mold temperature, for example, to retard cooling of the expanded parison in the area of the aperture 18, while enhancing cooling of the remainder of the parison. In this manner, the temperature of the parison, which is in direct contact with the cavity surface, in the area of the aperture 18, is maintained at a sufficiently high level to permit sealing of the parison by the pinch rod 22.

Turning now to a more detailed consideration of the present invention, which is illustrated in its preferred embodiments for the purpose of illustration and not limitation, FIG. 1 depicts the present as employed in a typical "blow molding" apparatus 10 in which the heated plastic parison 12 is expanded to conform to the shape of a container or other article. The "blowing molding" apparatus 10 has an extruder (not shown) which forces thermoplastic materials, e.g., polyolefins or other materials, through an annular die or head 28 to form the molten, tubular-shaped parison 12, which is positioned between the facing pair of mold halves 16. Each of the mold halves 16 has a relieved surface portion 30 which defines a symmetrical one half of the plastic article, e.g., a container (as shown). When the molds are closed about the parison, at the so called parting line, they create the interior cavity 14 which corresponds to the finished container shape. When the mold halves close, the parison is sealed between them at its lower end, and pressurized air is injected into the parison through the blow pin 20 which is positioned generally concentrically within the parison. The compressed air causes the parison to expand within the cavity 14 to conform to the shape of the container.

For simplicity in FIG. 1, only the portion of the cavity 14 defining the neck and top portion of the plasma bottle is shown. The shape of the remainder of the container may be seen more fully in FIGS. 16 and 17, and also in U.S. Pat. No. 3,939,623.

The mold halves are typically made of aluminun or other metal which is relatively easy to machine but sufficiently strong to sustain the pressures and heat involved. In the illustrated embodiment, each mold half includes two parts, a lower mold portion which forms the container body, neck and a portion of the top, and a neck ring 32 mounted atop the mold half. Although the neck ring could be made as part of the mold, it is provided separately in the illustrated embodiment and is made of a beryllium-copper alloy. Each neck ring has a relieved surface portion 34 defining the top end or dome of the container shaped cavity 14.

Referring to the enlarged views in FIGS. 4–7 and 10–13, the dome defining surface 34 of each neck ring has a semi-circular edge portion 36 which forms one half of the opening or aperture 18 in the mold cavity, through which the parison extends, parallel to the mold parting line.

For closing and sealing the end of the parison in accordance with the present invention, the sealing members or pinch rods 22 are slidably positioned within a cylindrical bore or cylinder 40 drilled into a raised boss portion 38 of each neck ring. The neck rings and pinch rods are mounted on diametrically opposite sides of the parison for engagement directly against the sides thereof to pinch the parison between them at the parting line. Referring to FIGS. 1–3, each pinch rod has a solid cylindrical portion 42 which is only slightly smaller than the bore 40 of the neck ring in which it is received in a piston-cylinder type arrangement. Pneumatic or hydraulic pressure may be applied through a port (not shown) in the boss 38 to drive the pinch rod axially along the bore 40 against the parison. The sealing member may be spring loaded for movement to the return position, or an additional pneumatic or hydraulic port may be provided in front of the cylindrical portion 42 to drive it rearwardly.

For engaging and sealing the parison 12, each pinch rod 22 has an end portion 44 which extends from one end of the cylindrical portion 42 and is preferably of integral, one piece construction therewith. The end portion has a shank 46 of generally rectangular shape, terminating in a parison engaging surface which includes the narrow protruding pinch edge 24, dam-forming recessed surface portion 23 above the pinch edge and seat 26 below the pinch edge. When the pinch rods are moved, as by hydraulic pressure in the bore 40 of each neck ring, they move against the parison until the facing pinch edges tightly abut along the parting line to seal and to sever or weaken the parison therebetween.

Seat 26 faces downwardly so that when the pinch rod is moved through a stroke, the seat 26 collects the plastic parison downwardly and seats it into the aperture. The seat is at approximately a 90° angle with respect to the pinch edge 24 and preferably has a shape corresponding to the desired external shape of the molded plastic article at the area of the aperture when it is sealed. For example, in the present invention the top end of the container is preferably substantially flat. Accordingly, the seat surface is flat so that the finish of the container with the plastic folded and compressed into the aperture will be flat.

The dam-forming recess 23 above the pinch edge has a tapered or slanting lower wall portion 31 that extends rearwardly from the top of the pinch edge and terminates in a vertical wall portion 33. As the pinch rods move together, the recess fills with plastic, forming, as shown in FIG. 7, a dam 35 of plastic above the pinch edge which blocks the escape of plastic needed to provide a seal from the seat surface 26 upwardly around the pinch edge 24.

Referring to FIGS. 4–7, the pinch rods 22 are positioned to engage the parison 12 at a first, selected position above the aperture 18. The stroke of each sealing member is at an acute angle A (FIG. 5), with respect to the parison, so that it simultaneously moves transversely of or against the parison and toward the aperture. This results in portions of the parison above the aperture and below the first position being collected and folded downwardly to span and seal the aperture. This may be contrasted with the sealing techniques shown in patents cited earlier, where the parison was engaged at a right angle and adjacent to the aperture, which required stretching and weakening of the plastic to span the aperture.

The sequential enlargements in FIGS. 4–7 exemplify the novel sealing operation of one embodiment of the present invention in detail. First, the parison is formed by extruding molten plastic through the annular die or head 28. (Shown only in FIG. 1). It should be noted that some molding machines do not have an extruder, but use a pre-extruded parison that is heated and positioned between the mold halves 16. The present invention may be used on either type of machine. The mold halves 16 close about the parison, and air is blown through the blow pin 20 to inflate the portion of the parison within the cavity 14 which, except for the aperture 18, has the shape of a finished container. To help maintain the elevated temperature of the parison and promote sealing, cooling in the area of the neck ring and aperture is retarded by flowing liquid of sufficiently elevated temperature through passageways 51, shown in FIG. 1.

After blowing and venting excess air pressure, but while the unexpanded portion of the parison above the aperture is still hot, the pinch rods are energized by pneumatic pressure or the like to initiate their stroke, which is preferably at about a 60° angle A with respect to the parison. The location and motion of the pinch rods are symmetrical about the parting line of the molds, and description of one also is representative of the other.

The pinch edge 24 of each pinch rod 22 first engages the side of the parison 12 at a position above the aperture 18 in the cavity 14 and preferably below the blow pin 20. Continued movement of the pinch rod causes the portion of the parison between the pinch edge and the aperture to be folded downwardly, as seen in FIGS. 5 and 6, to span the aperture. In other words, plastic is not stretched to cover the aperture but folded or collected down from above to overlie and seal the container at the aperture. The pinch rods 22 are positioned to meet at the mold parting line. As the pinch edges 24 come together (FIGS. 6 and 7), the molten plastic from the two sides of the parison flows together to seal the aperture, and tight abutment of the pinch edges severs or weakens (for later removal) the remainder of the parison from the container. The dam-forming recess 23 above the pinch edge collects and fills with plastic as the pinch rods move together. Because the recess is filled with plastic, which is slightly pressurized by movement of the pinch rods together, a dam of plastic is thus formed which blocks the escape of plastic needed for a seal from below the pinch edge 24. The rods are also positioned so that at the end of the stroke, the seat 26 is adjacent the aperture to seal the molten plastic uniformly thereacross.

To assure alignment of the pinch edges 24 to abut at the parting line the pinch rod is locked to prevent rotation out of alignment by flush engagement between the side surfaces of the rectangular shank 46 and planar surfaces of a retainer or guide 52. This retainer also includes an integral inwardly extending seal ring 54 which forces the parison into close contact with the blow pin 20, so that the compressed blowing air does not escape upwardly between the pin and the parison during formation of the container. After the seal is complete, the sealing members are retracted, the mold is opened, and the formed containers are removed from between the mold sections 16.

As may be seen in FIG. 7, the container top formed employing this method and apparatus is substantially uniform without stretched or weakened portions and has a smooth exterior surface corresponding and blending with the exterior surface of the bottle. In addition, it is readily piercable by a spike or the like for transfer or fluid thereinto.

FIGS. 8–15 depict an alternative embodiment of the pinch rod 22 employed in the present invention, along with the seal created by this rod. Elements common to this embodiment and that described earlier in FIG. 2-7 will use like numbers for description purposes. FIG. 8 is a cross-sectional view of the end of the pinch rod 22. As with the earlier described pinch rod, the parison engaging surface of this pinch rod includes a protruding pinch surface 24 for severing or weakening the parison and a recess portion 23 above the pinch surface for collecting a dam 35 of plastic when the pinch rods are moved together. The alternative embodiment, however, also includes a reservoir defining recessed portion 25, in the form of a right angle recess, below the pinch edge 24. One side of the recess extends rearwardly from the flat pinch edge, at about a 90° angle thereto. The other side of the recess merges into a rearwardly curved heel portion 37 below the recess. The remainder of this alternative pinch rod is substantially the same as that described earlier in FIG. 2, with a flat-sided shank portion 44 and a cylindrical portion 42 for mounting within the bore 40 of the neck ring boss 38.

The operation of the alternative embodiment pinch rod 22 is illustrated in detail in FIGS. 10-13. This sealing process is like that described above, except that when the alternative embodiment pinch rods are moved together, the lower recessed surface portion 25 provides a reservoir for collecting plastic that is joined to form a seal across the container top. In addition, the vertical wall of the recess 25 provides a frictional resistance surface, or plow for dragging and pulling plastic across the aperture 18 in the top of the mold. The curved heel 29 below the reservoir follows the plowing action of the recess to smooth the plastic across the aperture during the pinching action of the pinch rods to prevent excessive thinning or thickening of the plastic in the top of the container. During the pinching action, the dam-forming recess 23 above the pinch edge 24 acts to block the escape of plastic from the reservoir recess 25 needed in the formation of the seal 27.

As shown in FIGS. 13, 14, and 15, the alternative pinch rod 22 forms the slightly thickened seal 27 adjacent the top of the container between the facing reservoirs 25 of the pinch rods. This seal has been found to be very reliable and not subject to splitting or cracking. Moreover, as best seen in FIG. 14, it takes up only a small portion of the bottle top and leaves plenty of surface area on the top for puncturing with a fluid transfer spike. Unlike the seals shown in the earlier patents, this seal is unobtrusive. It is substantially in the plane in the bottle top (see FIG. 15) and does not interfere with puncturing the bottle top with a spike, needle or the like. An additional unique aspect of this seal is that it has been found to be substantially a plastic to plastic mechanical adhesive-type bond between the plastic of the two facing reservoirs rather than a chemical molecular bond.

An additional feature of the present invention, which aids in the sealing of the molded container, is precise temperature control of different parts of the mold to selectively enhance or retard cooling of the plastic parison in different areas of the mold. This is best seen in FIGS. 16, 17, and 18. In FIGS. 16 and 17, one of the mold halves 16 with attached neck ring 32 are shown in both frontal and side views. The lower mold portion 16, which is typically made of aluminum, has two separate fluid conduit circuits 37 and 39 for controlling the temperature of selected portions of the mold. Passageway 37 has an inlet 41 through the bottom of the mold halve 16. The passageway 37 continues upwardly along one side edge of the bottle shaped cavity, across the neck area of the mold and then back down the other side edge of the cavity exiting through outlet 43 in the bottom of the mold. The second and independent fluid circuit 39 has an entrance 45 with a passageway that continues upwardly between the interior wall of the cavity and the back side of the mold, across the shoulder portion of the mold cavity, then returning to exit 47 in the bottom of the mold. The neck ring 32 has its own independent fluid conduit 51 adjacent the dome-forming area of the neck ring for a separate temperature control of the neck ring, where the closing operation of the container occurs.

As seen in the schematic drawing in FIG. 18, although the lower portion of the mold has two separate cooling conduits for selective cooking, in molding the plasma bottle, cooling water is passed through both to keep the mold sufficiently cooled that the plastic parison "sets up" as soon as it is blown into contact with the mold cavity surface. On the other hand, water of a higher temperature is passed through the passageway 51 in the neck 32 to retard rather than enhance cooling of the parison in that area. The heated water flowing through the neck ring is preferably of a substantially lower temperature than the melt temperature of the plastic being molded but sufficiently high to retard cooling of the neck ring to keep the thermoplastic parison in the area of the aperture 18 warm enough that the plastic readily seals when the sealing members are brought together. The higer temperature in the neck ring 32 may, when equilibrium is reached, result in heating of the raised boss portion 38 of the neck ring and the pinch rod 22 slidably mounted therein. The heated pinch rod may also enhance the formation of a seal in the bottle top.

In the preferred embodiment of the present invention, water is the coolant passed through the conduits or circuits of the mold and neck ring. For the mold half 16, the water temperature is preferably about 50° F., and may be taken directly from a chilled water source 49. For the neck ring 32 the water temperature is preferably about 170° F., which may be achieved automatically by a mixing valve 51 which combines water from a hot water source 53 and a chilled water source 55 to provide a circulating water temperature the selected temperature. This maintains the temperature of the portion 34 of the cavity 14 at the neck ring between about 150° and 200° F. for preventing premature parison cooling.

In summary, it may be appreciated that the present invention provides new and unique apparatus for integrally closing and sealing a plastic article, particularly a container such as a bottle, molded by expanding a heated plastic parison. A strong but unobtrusive seal is formed between a pair of sealing members 22 which have unique parison-engaging surfaces that cooperate to seal the parison together substantially in the plane of the container surface without undue stretching or weakening of the plastic. To aid in the molding of the article and the formation of the seal, the temperature of the mold is selectively controlled to retard cooling of the parison in the area of the closure until the seal is completed while enhancing cooling of the parison in other areas to cause immediate cooling "set-up" of the container there.

The present invention has been described in terms of the preferred embodiment for the purpose of illustration and not limitation, and it is intended that changes, substitutions or the like which are obvious to one skilled in the art, come within the scope of this invention, as defined in the following claims.

What is claimed is:

1. In a plastic molding apparatus comprising a plurality of mold sections closable to define a mold having an interior cavity of selected shape about a heated plastic parison and means for expanding said parison to conform to the shape of said interior cavity, opening means in said cavity through which said parison extends, the improvement comprising means for sealing said parison comprising a pair of sealing members including facing parison engaging surfaces on opposite sides of said parison and movable relative to said mold sections to engage said parison between said facing parison engaging surfaces, each of said parison engaging surfaces comprising a protruding surface portion with an elongated narrow pinch edge for pinching the parison together, and a recessed surface portion therebelow defining a plastic receiving reservoir, said interior cavity of said mold defining a generally planar surface adjacent said opening means through which said parison extends, said sealing members being movable to seal said parison therebetween in the area of said opening means whereby said recesses form a thickened seal portion substantially in the same plane as said planar surface.

2. Apparatus in accordance with claim 1 wherein said recessed surface portion includes a wall defining a curved heel portion for smoothing plastic upon movement of said sealing member.

3. Apparatus in accordance with claim 1 wherein said parison engaging surface further comprises a plastic dam-forming recess above said protruding surface portion to block the escape of plastic from said reservoir during movement of said sealing member.

4. Apparatus in accordance with claim 1 wherein said reservoir forming recessed surface portion comprising a right angle recess, one wall of said right angle recess extending rearwardly from said pinch edge, the other wall of said right angle recess terminating in a curved, plastic-smoothing heel portion, and said engaging surface further comprising a plastic dam-forming recess portion above said pinch edge to retard the escape of plastic from right angle recess around said pinch edge.

5. Apparatus in accordance with claim 1 wherein said parison is in direct contact with said mold adjacent the seal area where engaged by said sealing member, said mold including temperature control means to selectively retard cooling of the parison adjacent said area relative to cooling of the parison in remaining portions of the mold.

6. Apparatus in accordance with claim 5 wherein said temperature control means comprises a first liquid conduit in said mold adjacent said seal area and a second liquid conduit in said mold free of communication with said first conduit and spaced therefrom.

7. Apparatus in accordance with claim 1 wherein said mold comprises a body defining portion for said selected cavity shape and a closure defining portion thereabove, said body and closure portions together defining said cavity, said closure portion defining said opening means and being in direct contact with said parison during molding, said closure portion including liquid conduit means for controlling the temperature thereof to retard the cooling of the parison adjacent said closure portion, said body portion including liquid conduit means flowably separate from the first mentioned conduit means.

8. Apparatus in accordance with claim 7 wherein said sealing member is movably received in said closure portion.

9. Apparatus in accordance with claim 1 wherein said cavity is of container-shape and said opening means is adjacent one end of said container.

10. Apparatus in accordance with claim 9 wherein said cavity is in the shape of a bottle and said opening means is in the plane of the top of the bottle, said sealing member being movable to form said thickened seal substantially in the plane of the bottle top.

11. Plastic blow molding apparatus comprising a pair of facing molds closable to define a bottle-shaped chamber about a heated plastic parison, said parison extending through an aperture in the top of said bottle-shaped chamber, said chamber defining a generally planar surface adjacent said aperture to provide a flat container top portion, means for expanding said parison to conform to the shape of said chamber, a pair of facing sealing members, each carried by one of said mold halves and being movable relative to said mold halves to engage and pinch the parison therebetween adjacent said aperture, each of said sealing members comprising a parison engaging surface including:

a protruding pinch surface for pinching the parison between adjacent pinch edges;

a recessed surface below said pinch surface defining a relatively shallow plastic receiving reservoir for creating a thickened seal between said sealing members substantially in the plane of said aperture;

a curved heel portion below said recess for smoothing plastic across said aperture during movement of said sealing member; and a recessed surface portion above said pinch surface adapted to form a plastic dam by compressing a portion of said parison above said pinch surface to prevent escape of plastic from said reservoir during sealing of the parison.

12. Apparatus in accordance with claim 11 wherein said parison is in direct contact with said mold adjacent said aperture, said mold including temperature control means to selectively retard cooling of the parison adjacent said aperture relative to cooling of the parison in remaining portions of the mold.

13. Apparatus in accordance with claim 12 further comprising means to cool said parison more slowly in the area of said aperture than in the remainder of said mold.

14. Apparatus in accordance with claim 12 wherein said temperature control means includes a first liquid conduit adjacent said aperture and a second liquid conduit flowably separate from said first and spaced therefrom.

15. Apparatus in accordance with claim 11 wherein each mold half includes a body portion which defines the body of said bottle and a closure portion thereabove defining the top of said bottle, said closure portion being in direct contact with said parison during molding, said closure portion including liquid conduit means for selectively retardingd the cooling of the parison thereagainst, said body portion including liquid conduit means flowably separate from the first-mentioned conduit means for establishing different parison cooling rates within the mold.

16. Apparatus in accordance with claim 15 wherein said sealing member is movably received in said closure portion.

* * * * *